United States Patent
Marsillach et al.

(10) Patent No.: US 12,291,237 B2
(45) Date of Patent: May 6, 2025

(54) TRAJECTORY PLANNING SYSTEM FOR ENSURING MANEUVERS TO AVOID MOVING OBSTACLES EXIST FOR AN AUTONOMOUS VEHICLE

(71) Applicant: GM Global Technology Operations LLC, Detroit, MI (US)

(72) Inventors: Daniel Aguilar Marsillach, Detroit, MI (US); Yubiao Zhang, Sterling Heights, MI (US); Upali P. Mudalige, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 17/938,192

(22) Filed: Oct. 5, 2022

(65) Prior Publication Data

US 2024/0132104 A1 Apr. 25, 2024

(51) Int. Cl.
*B60W 60/00* (2020.01)
*B60W 50/00* (2006.01)

(52) U.S. Cl.
CPC .... *B60W 60/0015* (2020.02); *B60W 50/0098* (2013.01); *B60W 60/0013* (2020.02); *B60W 2050/0026* (2013.01); *B60W 2555/60* (2020.02); *B60W 2556/45* (2020.02)

(58) Field of Classification Search
CPC ............. B60W 60/0015; B60W 60/13; B60W 50/0098; B60W 2556/45; B60W 2555/60; B60W 2050/0026
See application file for complete search history.

(56) References Cited

U.S. PATENT DOCUMENTS

| | | | | |
|---|---|---|---|---|
| 10,829,116 | B2* | 11/2020 | Iagnemma | B60W 10/04 |
| 2019/0361456 | A1* | 11/2019 | Zeng | G01C 21/20 |
| 2020/0086858 | A1* | 3/2020 | Yao | G05D 1/0253 |
| 2021/0110484 | A1* | 4/2021 | Shalev-Shwartz | G05D 1/0088 |
| 2021/0171061 | A1* | 6/2021 | Etesami | B60W 30/0956 |
| 2022/0147051 | A1* | 5/2022 | Li | G01C 21/3407 |
| 2023/0001953 | A1* | 1/2023 | McAllister | B60W 10/18 |

(Continued)

OTHER PUBLICATIONS

Ahn, et al. "Reachability-Based Decision-Making for Autonomous Driving: Theory and Experiments," IEEE Transactions on Control Systems Technology, vol. 29, No. 5, pp. 1907-1921, Sep. 2021.

(Continued)

*Primary Examiner* — Peter D Nolan
*Assistant Examiner* — Wae L Louie
(74) *Attorney, Agent, or Firm* — Vivacqua Crane, PLLC

(57) ABSTRACT

A trajectory planning system for an autonomous vehicle includes one or more controllers in electronic communication with one or more external vehicle networks that collect data with respect to one or more moving obstacles located in an environment surrounding the autonomous vehicle. The one or more controllers determine, based on the discrete-time relative vehicle state, a position avoidance set representing relative lateral positions and longitudinal positions that the autonomous vehicle avoids while bypassing the one or more moving obstacles when performing a maneuver. The one or more controllers select a trajectory from the plurality of relative state trajectories for the autonomous vehicle, where the autonomous vehicle follows the trajectory while performing the maneuver.

20 Claims, 4 Drawing Sheets

(56) References Cited

U.S. PATENT DOCUMENTS

| | | | |
|---|---|---|---|
| 2023/0140569 A1* | 5/2023 | Foster .............. | B60W 60/0017 701/400 |
| 2024/0025444 A1* | 1/2024 | Omari .............. | B60W 60/0015 |
| 2024/0367650 A1* | 11/2024 | Valverde ............ | B60W 60/001 |

OTHER PUBLICATIONS

Magdici, et al. "Fail-safe motion planning of autonomous vehicles," 2016 IEEE 19th International Conference on Intelligent Transportation Systems (ITSC), 2016, pp. 452-458.

Manzinger, et al. "Using Reachable Sets for Trajectory Planning of Automated Vehicles," IEEE Transactions on Intelligent Vehicles, vol. 6, No. 2, pp. 232-248, Jun. 2021.

Pek, et al. "Computationally Efficient Fail-safe Trajectory Planning for Self-driving Vehicles Using Convex Optimization," 2018 21st International Conference on Intelligent Transportation Systems (ITSC), 2018, pp. 1447-1454.

* cited by examiner

TRAJECTORY PLANNING SYSTEM FOR ENSURING MANEUVERS TO AVOID MOVING OBSTACLES EXIST FOR AN AUTONOMOUS VEHICLE

INTRODUCTION

The present disclosure relates to a trajectory planning system for an autonomous vehicle, where the trajectory planning system ensures maneuvers to avoid one or more moving obstacles always exist when the autonomous vehicle is driving.

Semi-autonomous and autonomous vehicles are becoming more ubiquitous on the road. An autonomous vehicle may execute various planning tasks such as mission planning, behavior planning, and local planning. In general, a mission planner determines a trajectory or route based on an ego vehicle's start position to an end position. A behavior planner focuses on handling moving obstacles and static objects while following any stipulated road rules as the vehicle progresses along the prescribed route determined by the mission planner.

Behavior planners do not currently utilize dynamics-based predictive information to make decisions regarding a vehicle's trajectory. As a result, in some instances a vehicle may not be able to complete a maneuver to avoid a moving obstacle in time during extreme or unexpected events. Some examples of extreme or unexpected event include inclement weather, when an actuator becomes non-operational, or to avoid erratic drivers. In particular, traditional approaches may use a kinematic model combined with worst-case accelerations to constrain the headway between vehicles. However, the kinematic model does not consider both linear and non-linear tire dynamics, higher-slip driving conditions, or coupled-motion between lateral and longitudinal states of the vehicle.

Thus, while current autonomous vehicles achieve their intended purpose, there is a need in the art for an improved trajectory planning system that ensures that evasive maneuvers always exist and are executable within an operating domain of interest by leveraging fidelity dynamic models.

SUMMARY

According to several aspects, a trajectory planning system for an autonomous vehicle is disclosed and includes one or more controllers in electronic communication with one or more external vehicle networks that collect data with respect to one or more moving obstacles located in an environment surrounding the autonomous vehicle. The one or more controllers executing instructions to determine a discrete-time relative vehicle state based on an autonomous vehicle dynamics model. The one or more controllers determine, based on the discrete-time relative vehicle state, a position avoidance set representing relative lateral positions and longitudinal positions that the autonomous vehicle avoids while bypassing the one or more moving obstacles when performing a maneuver. The one or more controllers determine a set of ego states for which the autonomous vehicle is unable to execute maneuvers without entering the position avoidance set for a set of given speed limits and road conditions. The one or more controllers compute a plurality of relative state trajectories for the autonomous vehicle, where the plurality of relative state trajectories avoid intersecting an evasion set for the set of ego states. The one or more controllers select a trajectory from the plurality of relative state trajectories for the autonomous vehicle, where the autonomous vehicle follows the trajectory while performing the maneuver.

In an aspect, the one or more controllers select the trajectory by assigning a score to each relative state trajectory for the autonomous vehicle based on one or more properties and selecting the relative state trajectory having the highest score as the trajectory.

In another aspect, the one or more properties include one or more of the following: ride comfort, fuel consumption, timing, and duration.

In yet another aspect, the trajectory planning system comprising a plurality of sensors in electronic communication with the one or more controllers, where the one or more controllers receive a plurality of dynamic variables as input from the plurality of sensors.

In an aspect, the one or more controllers determine the autonomous vehicle dynamics model for the autonomous vehicle based on the plurality of dynamic variables, vehicle chassis configuration information, and a control input vector corresponding to the autonomous vehicle.

In another aspect, the position avoidance set is determined by:

$$\mathcal{S} = \{(e_s, e_d) \in R^2 : e_{s,l} \le e_s \le e_{s,u}, e_{d,l} \le e_d \le e_{d,u}\}$$

where $\mathcal{S}$ is the position avoidance set, $e_s$ is a discrete-time relative longitudinal state of the autonomous vehicle, $e_d$ is a discrete-time relative lateral state of the autonomous vehicle, $e_{s,l}$ is a lower limit of the discrete-time relative longitudinal state $e_s$, $e_{s,u}$ is an upper limit of the discrete-time relative longitudinal state $e_s$, $e_{d,l}$ is a lower limit of the discrete-time relative lateral state $e_d$, and $e_{d,u}$ is a lower limit of the discrete-time relative longitudinal state $e_s$, of the position avoidance set $\mathcal{S}$.

In yet another aspect, the evasion set for the set of ego states is saved as one or more look-up tables and are indexed based on a current speed limit of a roadway that autonomous vehicle is presently traveling along and one or more road conditions.

In an aspect, the one or more controllers determine the plurality of relative state trajectories for the autonomous vehicle based on an initial state of the autonomous vehicle, a final state of the autonomous vehicle, and one or more levels of driving aggression.

In another aspect, the one or more levels of driving aggression include a conservative level, a moderate level, and an aggressive level of aggression.

In yet another aspect, the one or more controllers determine the set of ego states during an offline process based on one of simulated data and experimental data.

In an aspect, the one or more moving obstacles include another vehicle located along a roadway that the autonomous vehicle is driving along.

In another aspect, the set of ego states represent vehicle states where the autonomous vehicle is unable to execute maneuvers during a time horizon to avoid the one or more moving obstacles.

In yet another aspect, the autonomous vehicle dynamics model includes one or more of the following: a linear tire model and non-linear tire models.

In an aspect, an autonomous vehicle including a trajectory planning system is disclosed and includes a plurality of sensors that determine a plurality of dynamic variables, one or more external vehicle networks that collect data with respect to one or more moving obstacles located in an environment surrounding the autonomous vehicle, and one or more controllers in electronic communication with the one or more external vehicle networks and the plurality of sensors. The one or more controllers executing instructions to determine an autonomous vehicle dynamics model for the autonomous vehicle based on the plurality of dynamic variables and vehicle chassis configuration information. The one or more controllers determine a discrete-time relative vehicle state based on the autonomous vehicle dynamics model. The one or more controllers determine, based on the discrete-time relative vehicle state, a position avoidance set representing relative lateral positions and longitudinal positions that the autonomous vehicle avoids while bypassing the one or more moving obstacles when performing a maneuver. The one or more controllers determine a set of ego states for which the autonomous vehicle is unable to execute maneuvers without entering the position avoidance set for a set of given speed limits and road conditions. The one or more controllers compute a plurality of relative state trajectories for the autonomous vehicle, where the plurality of relative state trajectories avoid intersecting an evasion set for the set of ego states. The one or more controllers select a trajectory from the plurality of relative state trajectories for the autonomous vehicle, where the autonomous vehicle follows the trajectory while performing the maneuver.

In another aspect, the one or more controllers select the trajectory by assigning a score to each relative state trajectory for the autonomous vehicle based on one or more properties and selecting the relative state trajectory having the highest score as the trajectory.

In yet another aspect, the evasion set for the set of ego states is saved as one or more look-up tables and are indexed based on a current speed limit of a roadway that autonomous vehicle is presently traveling along and one or more road conditions.

In an aspect, the one or more controllers determine the plurality of relative state trajectories for the autonomous vehicle based on an initial state of the autonomous vehicle, a final state of the autonomous vehicle, and one or more levels of driving aggression.

In another aspect, the autonomous vehicle dynamics model includes one or more of the following: a linear tire model and non-linear tire models.

In an aspect, a method for selecting a trajectory for an autonomous vehicle includes determining, by one or more controllers, a discrete-time relative vehicle state based on an autonomous vehicle dynamics model, where the one or more controllers are in electronic communication with one or more external vehicle networks that collect data with respect to one or more moving obstacles located in an environment surrounding the autonomous vehicle. The method includes determining, based on the discrete-time relative vehicle state, a position avoidance set representing relative lateral positions and longitudinal positions that the autonomous vehicle avoids while bypassing the one or more moving obstacles when performing a maneuver. The method includes determining a set of ego states for which the autonomous vehicle is unable to execute maneuvers without entering the position avoidance set for a set of given speed limits and road conditions. The method also includes computing a plurality of relative state trajectories for the autonomous vehicle, where the plurality of relative state trajectories avoid intersecting an evasion set for the set of ego states. The method also includes selecting a trajectory from the plurality of relative state trajectories for the autonomous vehicle, where the autonomous vehicle follows the trajectory while performing the maneuver.

In another aspect, the method includes selecting the trajectory by assigning a score to each relative state trajectory for the autonomous vehicle based on one or more properties and selecting the relative state trajectory having the highest score as the trajectory.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
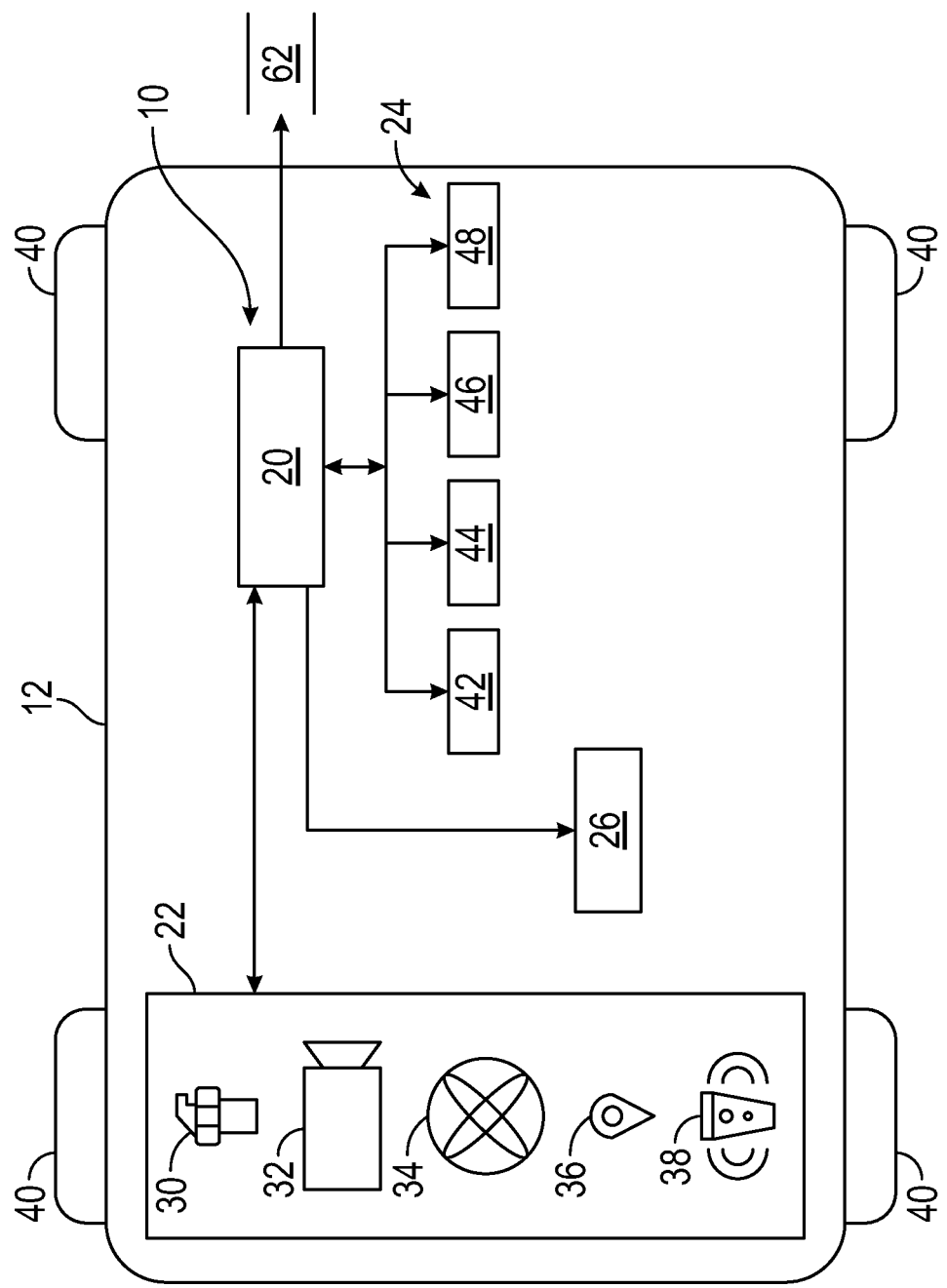
FIG. 1 is a schematic diagram of an autonomous vehicle including the disclosed trajectory planning system, where the trajectory planning system includes one or more controllers in electronic communication with a plurality of sensors, according to an exemplary embodiment.

Referring to FIG. 1, an exemplary trajectory planning system 10 for an autonomous vehicle 12 is illustrated. The trajectory planning system 10 ensures that maneuvers to avoid one or more moving obstacles always exist for the autonomous vehicle 12. It is to be appreciated that the autonomous vehicle 12 may be any type of vehicle such as, but not limited to, a sedan, truck, sport utility vehicle, van, or motor home. The autonomous vehicle 12 may be a fully autonomous vehicle including an automated driving system (ADS) for performing all driving tasks or a semi-autonomous vehicle including an advanced driver assistance system (ADAS) for assisting a driver with steering, braking, and/or accelerating.

The trajectory planning system 10 includes one or more controllers 20 in electronic communication with a plurality of sensors 22 configured to monitor data indicative of a dynamic state of the autonomous vehicle 12 and data indicating obstacles located in an environment 52 (FIG. 2) surrounding the vehicle 12. In the non-limiting embodiment as shown in FIG. 1, the plurality of sensors 22 include one or more wheel speed sensors 30 for measuring an angular wheel speed of one or more wheels 40 of the autonomous vehicle 12, one or more cameras 32, an inertial measurement unit (IMU) 34, a global positioning system (GPS) 36, and LiDAR 38, however, is to be appreciated that additional sensors may be used as well. The one or more controllers 20 are also in electronic communication with a plurality of vehicle systems 24. In one non-limiting embodiment, the vehicle systems 24 include a brake system 42, a steering system 44, a powertrain system 46, and a suspension system 48, however, it is to be appreciated that other vehicle systems may be included as well. The one or more controllers 20 are also in electronic communication with one or more external vehicle networks 26. The one or more external vehicle networks 26 may include, but are not limited to, cellular networks, dedicated short-range communications (DSRC) networks, and vehicle-to-infrastructure (V2X) networks.

Figure 2:
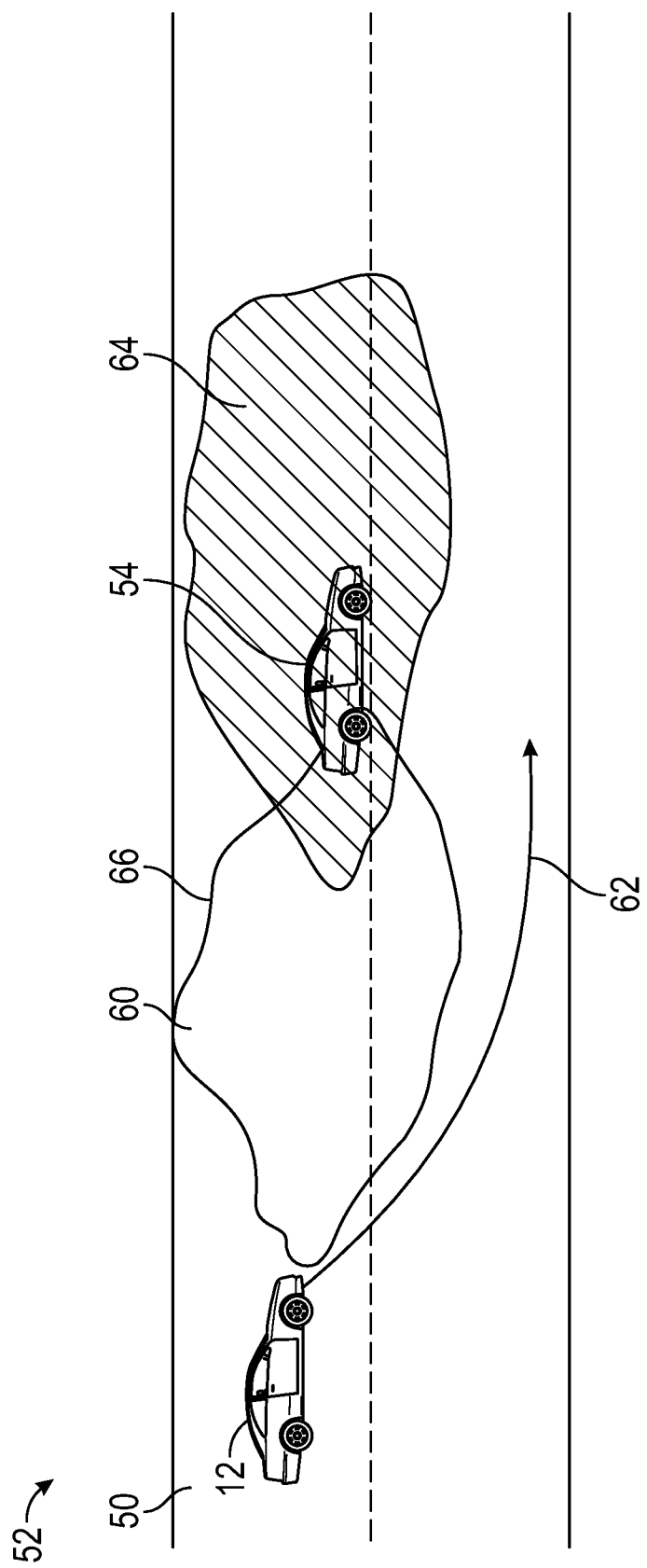
FIG. 2 is an illustration of the autonomous vehicle and another vehicle driving along a roadway, according to an exemplary embodiment.

FIG. 2 is an illustration of the autonomous vehicle 12 traveling along a roadway 50 in the environment 52 surrounding the autonomous vehicle 12, where the environment 52 includes one or more moving obstacles 54 disposed along the roadway 50. In the example as shown in FIG. 2, the moving obstacle 54 is another vehicle located along the roadway 50 that the autonomous vehicle 12 is driving along, however, it is to be appreciated that FIG. 2 is merely exemplary in nature. Indeed, the moving obstacle 54 may be any moving object that the autonomous vehicle 12 avoids contacting such as, for example, bicycles, pedestrians, and animals. The one or more controllers 20 (FIG. 1) may receive information regarding the moving obstacle 54 via the one or more external vehicle networks 26. As seen in FIG. 2, a region of interest 60 exists between the moving obstacle 54 and the autonomous vehicle 12. The region of interest 60 represents an area along the roadway 50 where the autonomous vehicle 12 is unable to execute a maneuver during a time horizon while avoiding contact with the moving obstacle 54. In one non-limiting embodiment, the maneuver is an evasive maneuver executed for purposes of avoiding a traffic incident with the moving obstacle 54. When the autonomous vehicle 12 is located outside of the region of interest 60, it is guaranteed that the autonomous vehicle 12 is able to execute a maneuver to avoid contacting the moving obstacle 54. If the autonomous vehicle 12 is within the region of interest 60, it is no longer guaranteed that the autonomous vehicle 12 will be able to execute a maneuver that avoids contact with the moving obstacle 54. This is because once the autonomous vehicle 12 enters the region of interest 60, now the ability to avoid obstacles is no longer determined solely by the planning and control algorithms executed by the autonomous vehicle 12, and instead is influenced or determined based on the actions of the moving obstacle 54 as well.

Referring to both FIGS. 1 and 2, the trajectory planning system 10 selects a trajectory 62 that the autonomous vehicle 12 follows, where the trajectory 62 does not intersect or avoids the region of interest 60 during the time horizon. As mentioned above, in some embodiments the trajectory 62 may be executed to purposely evade or avoid the moving obstacle 54. The autonomous vehicle 12 follows the trajectory 62 when performing a maneuver while avoiding the one or more moving obstacles 54. It is to be appreciated in some embodiments, the trajectory 62 may slightly encroach the region of interest 60 along its boundaries 66. During the time horizon, the moving obstacle 54 moves as well, where the region of movement created by the moving obstacle 54 is represented by a moving obstacle region 64. When the autonomous vehicle 12 avoid entering the region of interest 60, it follows that the autonomous vehicle 12 may avoiding entering the moving obstacle region 64.

Figure 3:
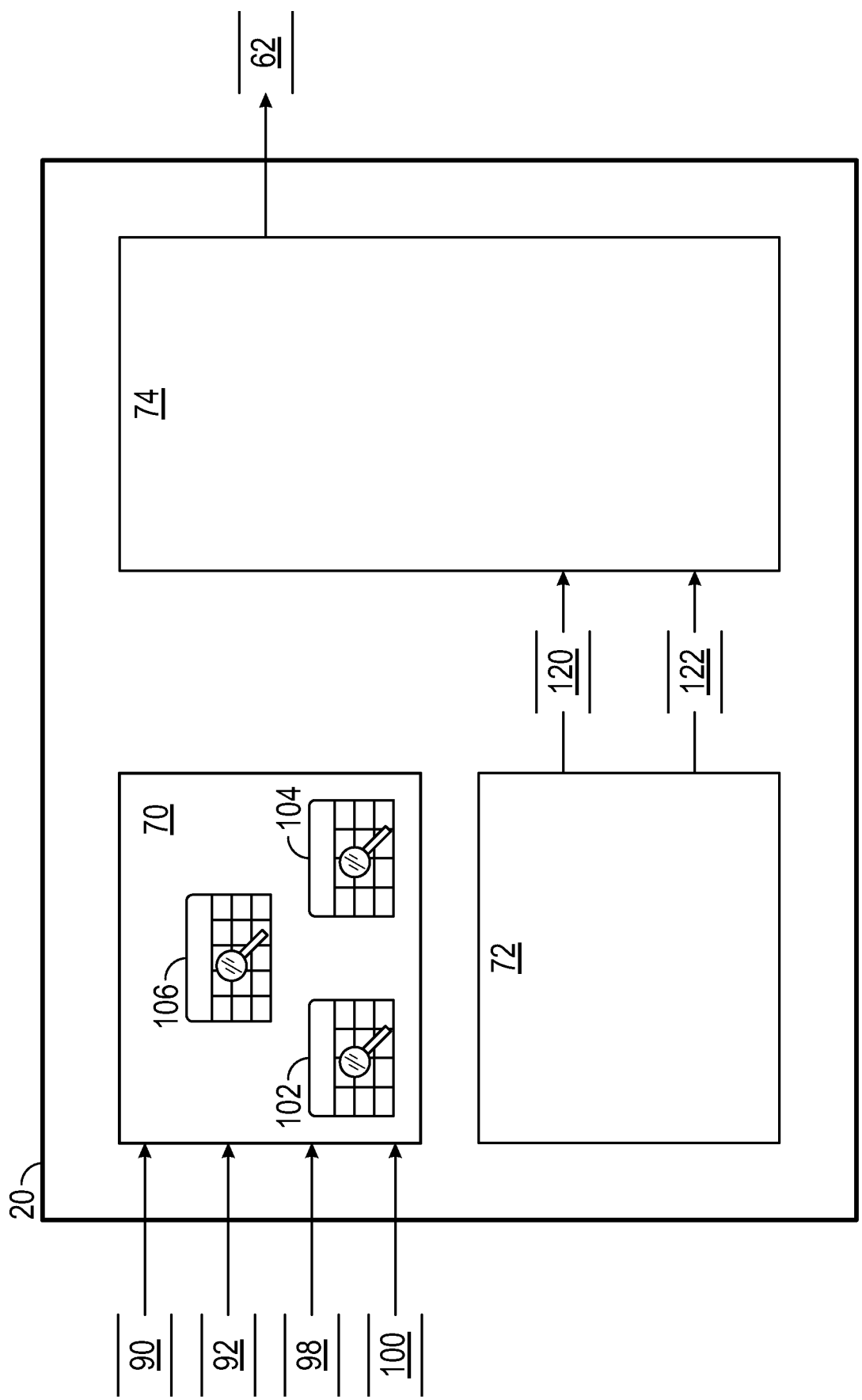
FIG. 3 is a block diagram of the one or more controllers shown in FIG. 1, according to an exemplary embodiment.

FIG. 3 is an illustration of the one or more controllers 20 shown in FIG. 1. The one or more controllers 20 includes an offline module 70, a state monitoring system module 72, and a real-time module 74 that selects the trajectory 62 of the autonomous vehicle 12 in real-time as the autonomous vehicle 12 is driving. The offline module 70 determines a set of ego states $\mathcal{C}_{N-k}$ corresponding to the autonomous vehicle 12, where the set of ego states $\mathcal{C}_{N-k}$ represent vehicle states where the autonomous vehicle 12 is unable to execute maneuvers during the time horizon to avoid the one or more moving obstacles 54, where k represents a time index or time step and the horizon of interest ranges from a final time N to a current or initial time 0, or k=N−1, . . . , 0. The offline module 70 also determines a multi-actor set of states $\mathcal{M}_{N-k}$ for both the autonomous vehicle 12 and one or more moving obstacles 54 located in the environment 52 (FIG. 2), where the multi-actor set of states $\mathcal{M}_{N-k}$ represent vehicle states where the autonomous vehicle 12 and the one or more moving obstacles 54 located in the environment 52 are unable to execute maneuvers to avoid one another during the time horizon. It is to be appreciated that the offline module 70 determines the set of ego states $\mathcal{C}_{N-k}$ and the multi-actor set of states $\mathcal{M}_{N-k}$ during an offline process based on simulated data or experimental data, while the trajectory 62 is determined in real-time as the autonomous vehicle 12 is driving.

The offline module 70 considers a control input vector $u_k^h$ corresponding to the autonomous vehicle 12 and a control input vector $u_k^o$ corresponding to the one or more moving obstacles 54 located in the environment 54. The control input vectors 4, $u_k^h$, $u_k^o$ are constrained based on data saved in the one or more controllers 20 or by inference based on information such as vehicle model, vehicle make, and vehicle type, where h denotes the host vehicle (i.e., the autonomous vehicle 12), and o denotes the moving obstacle 54. The control input vector $u_k^h$ represents a vector form of input variables that are used to determine an autonomous vehicle dynamics model, which is described below. Specifically, the input variables for determining the autonomous vehicle dynamics include a longitudinal acceleration $a_{long}$ and a steering wheel angle δ of the autonomous vehicle 12. The input variables, which are in vector form, belongs to or are constrained by an admissible input set $u^h$ that captures an upper limit and a lower limit for the longitudinal acceleration $a_{long}$ and the steering wheel angle δ. Similarly, a control input vector $u_k^o$ corresponding to the one or more moving obstacles 54 located in the environment 54 represents the vector form of the input variables to the dynamics model of the moving obstacle 54 (i.e., a longitudinal acceleration $a_{long}$ and a steering wheel angle δ corresponding to the moving obstacle 54). The input vector of the moving obstacle 54 belongs to or is constrained by an admissible input set $u^o$, that captures an upper limit and a lower limit for the longitudinal acceleration $a_{long}$ and the steering wheel angle δ of the moving obstacle 54.

Referring to FIGS. 1-3, the offline module 70 receives a plurality of dynamic variables 90 as input from the one or more sensors 22, where the dynamic variables 90 each represent an operating parameter indicative of a dynamic state of the autonomous vehicle 12 and driving environment conditions. Some examples of driving environment conditions include, but are not limited to, type of road, road surface, and weather conditions. It is to be appreciated that the dynamic variables 90 are determined based on experimental data or, alternatively, simulated data. The offline module 70 also receives vehicle chassis configuration information 92 as input as well, where the vehicle chassis configuration information 92 indicates information such as, but not limited to, number of wheels, number of driven wheels, and number of steered wheels. The offline module 70 determines the autonomous vehicle dynamics model for the autonomous vehicle 12 based on the dynamic variables 90, the vehicle chassis configuration information 92 for the autonomous vehicle 12, and the control input vector $u_k^o$ for the autonomous vehicle 12.

The offline module 70 also receives dynamics variables 98 and vehicle chassis configuration information 100 regarding one or more vehicles located in the environment 52 surrounding the autonomous vehicle 12 from the one or more external vehicle networks 26. The offline module 70 determines the obstacle dynamics model based on the dynamic variables 98, the vehicle chassis configuration information 100, and the control input vector $u_k^h$ corresponding to the one or more moving obstacles 54 located in the environment 52. It is to be appreciated that both the vehicle dynamic model and the obstacle dynamics model are both expressed in terms of the Frenet coordinate system. Both the autonomous vehicle dynamics model and the obstacle dynamics model are based on the dynamic modeling approach, and not the kinematic modeling approach. It is to be appreciated that the autonomous vehicle dynamics model and the obstacle dynamics model include linear and/or non-linear tire models as well as coupling between lateral states and longitudinal states of the relevant vehicle.

The offline module 70 determines a discrete-time relative vehicle state e based on the autonomous vehicle dynamics model for the autonomous vehicle 12 and the obstacle dynamics model for the one or more moving obstacles 54 located in the environment 52, where the discrete-time relative vehicle state e represents a function that predicts a relative state of the autonomous vehicle 12 at the next time step k, with respect to the moving obstacle 54. It is to be appreciated that the lateral displacements and the longitudinal displacements of the discrete-time relative vehicle state e are expressed in the Frenet coordinate system.

The offline module 70 determines the discrete-time relative vehicle state e by first determining a difference in position and velocity between the autonomous vehicle dynamics model corresponding to the autonomous vehicle 12 and the obstacle dynamic model of the one or more moving obstacles 54 located in the environment 52 to determine a relative nonlinear dynamic model. As mentioned above, the autonomous vehicle dynamics model for the autonomous vehicle 12 and the obstacle dynamics model for the one or more moving obstacles 54 located in the environment 52 both include a linear tire model, a non-linear tire model, or both the linear and non-linear tire model. Accordingly, the non-linear tire model of the relative non-linear dynamic model is linearized about an operating condition of interest. One example of an operating condition of interest is constant speed along a centerline of a lane, however, it is to be appreciated that other operating conditions may be used as well. Linearizing the non-linear tire model results in a continuous time plant and input matrices associated with the relative nonlinear dynamic model. The linearized relative nonlinear dynamics model is then discretized from a continuous-time model into a discrete time model. In an embodiment, the linearized relative nonlinear dynamics model is discretized by either a zero-order hold model or a first-order hold model, which yields the discrete-time relative vehicle state e, however, other discretization approaches may be used as well.

The offline module 70 then determines the position avoidance set $\mathcal{S}$ and the occupancy set $\mathcal{O}$, which are both expressed in Frenet frame coordinates based on the discrete-time relative vehicle state e. The position avoidance set $\mathcal{S}$ represents relative lateral positions and longitudinal positions that the autonomous vehicle 12 avoids in order to bypass or avoid contact with the moving obstacle 54 while performing a maneuver. In an embodiment, the position avoidance set $\mathcal{S}$ is expressed by Equation 1, which is:

$$\mathcal{S} = \{(e_s, e_d) \in R^2 : e_{s,l} \leq e_s \leq e_{s,u}, e_{d,l} \leq e_d \leq e_{d,u}\} \quad \text{Equation 1}$$

where $e_s$ is a discrete-time relative longitudinal state of the autonomous vehicle 12, $e_d$ is a discrete-time relative lateral state of the autonomous vehicle 12, $e_{s,l}$ is a lower limit of the discrete-time relative longitudinal state $e_s$, $e_{s,u}$ is an upper limit of the discrete-time relative longitudinal state $e_s$, $e_{d,l}$ is a lower limit of the discrete-time relative lateral state $e_d$, and $e_{d,u}$ is a lower limit of the discrete-time relative longitudinal state $e_s$, of the avoidance set $\mathcal{S}$. It is to be appreciated that the limits merely characterize the avoidance set $\mathcal{S}$, and not the lateral or longitudinal states of the autonomous vehicle 12 while driving The occupancy set $\mathcal{O}$ is centered at the moving obstacle 54 and represents lateral positions and longitudinal positions that bound the one or more moving obstacles 54 located in the environment 52 (FIG. 2) at the current or an initial time. In an embodiment, the occupancy set $\mathcal{O}$ is expressed in Equation 2 as:

$$\mathcal{O} = \{(s, d) \in R^2 : s_l \leq s \leq s_u, d_l \leq d \leq d_u\} \quad \text{Equation 2}$$

where s is a longitudinal position of the one or more vehicles, d is the lateral position of the one or more vehicles, $s_l$ is the lower limit of the longitudinal position, $s_u$ is the upper limit of the longitudinal position, $d_l$ is the lower limit of the lateral position, and $d_u$ is the upper limit of the lateral position of the initial occupancy set $\mathcal{O}_0$. Referring to both FIGS. 2 and 3, a union $\cup_{k=0}^{N} \mathcal{O}_k$ for the occupancy set 0 along the horizon of interest is represented by the moving obstacle region 64.

The offline module 70 then determines the set of ego states $\mathcal{C}_{N-k}$ for which the autonomous vehicle 12 is unable to execute the maneuver without entering the position avoidance set $\mathcal{S}$ over the horizon of interest for a set of given set of parameters. The given set of parameters include variables such as speed limits and road conditions, and the set of ego states $\mathcal{C}_{N-k}$ are calculated for each time step index and the horizon of interest ranges from the final time N to a current or initial time 0, or k=N−1, . . . , 0 based on a backwards reachability analysis from the final time N to the initial time 0. Some examples of road conditions include, but are not limited to, road geometry, curvature, inclination, and coefficient of friction based on road conditions. At the final time N, the individual set of ego states $\mathcal{C}_N$ is equal to the position avoidance set $\mathcal{S}$. The backwards reachability analysis varies the step N from an initial time of interest to a final time of interest, which characterizes the horizon of interest. For each time step, an individual ego state $\mathcal{C}_{N-k}$ is determined based on Equation 3 and is backwards calculated from a chosen final time N to the initial time 0, and is expressed as:

$$\mathcal{C}_{N-k} = \{e_{k+1} \in \varepsilon | \forall u_k^h \in \mathcal{U}^h, \exists u_k^o \in \mathcal{U}^o, A_k e_k + B_k^h u_k^h + B_k^h u_k^o \in \mathcal{C}_{N-k+1}\} \quad \text{Equation 3}$$

where e k+1 is the discrete-time relative vehicle state at time step k−1, $\varepsilon$ is a set of admissible relative position and velocity states between the autonomous vehicle 12 and the moving obstacle 54, $\mathcal{U}^h$, $\mathcal{U}^o$ are the admissible input sets of the autonomous vehicle 12 or the one or more vehicles located in the environment 52, respectively, that represents combinations of the longitudinal acceleration $a_{long}$ and the steering wheel angle δ, $A_k$ is a continuous-time plant matrix of the linearized relative dynamics model, $e_k$ is the discrete-time relative vehicle state at the time step k, $B_k^h$ is a continuous-time input matrix of the autonomous vehicle 12 with respect to the time step k, and $B_k^o$ is a continuous-time input matrix of the one or more moving obstacles 54 in the environment 52 with respect to the time step k.

Once the offline module 70 solves for the set of ego states $\mathcal{C}_{N-k}$, the offline module 70 then repeats solving the set of ego states $\mathcal{C}_{N-k}$ while varying the time step index N from 0 to $N_f$, where $N_f$ is the maximum horizon time. It is to be appreciated that a Minkowski sum and Pontryagin differences may be performed between each set. A union between the ego states $\mathcal{C}_{N-k}$ is determined, where the union is expressed as an evasion set $\cup_{k=0}^{N}\mathcal{C}_{N-k}$ for the set of ego states. The evasion set $\cup_{k=0}^{N}\mathcal{C}_{N-k}$ for the ego set of states is saved as one or more look-up tables 102 and are indexed based on a current speed limit of the roadway 50 (FIG. 2) and one or more road conditions. The one or more road conditions include factors such as, but not limited to, road geometry, curvature, the coefficient of friction, and inclination. Referring to both FIGS. 2 and 3, the evasion set $\cup_{k=0}^{N}\mathcal{C}_{N-k}$ for the set of ego states is represented by the region of interest 60, where the region of interest 60 represents the area along the roadway 50 where the autonomous vehicle 12 is unable to execute a maneuver during the time horizon while avoiding the moving obstacle 54. The look-up table 102 may be saved in memory of the one or more controllers 20 or, alternatively, in another location. In embodiments, the data saved within the one or more look-up tables 102 may be approximated and simplified for purposes of memory allocation.

The offline module 70 determines the multi-actor set of states $\mathcal{M}_{N-k}$ where the autonomous vehicle 12 and the one or more moving obstacles 54 located in the environment 52 are unable to execute the maneuver without entering the position avoidance set $\mathcal{S}$ over the horizon of interest for a set of speed limits, where an individual multi-actor set of states $\mathcal{M}_{N-k}$ are calculated for each time step index N based on a backwards reachability analysis from the final time N to the initial time 0. At the time step N, the individual multi-actor set of states $\mathcal{M}_N$ is equal to the position avoidance set $\mathcal{S}$. For each time step, an individual multi-actor set of states $\mathcal{M}_{N-k}$ is determined based on Equation 4 and is backwards calculated from the final time N to the initial time 0, and is expressed as:

$$\mathcal{M}_{N-k} = \{e_{k+1} \in \varepsilon | \forall u_k^h \in \mathcal{U}, \forall u_k^o \in \mathcal{U}, A_k e_k + B_k^h u_k^h \in \mathcal{M}_{N-k+1}\} \quad \text{Equation 4}$$

Once the offline module 70 determines the multi-actor set of states $\mathcal{M}_{N-k}$, the offline module 70 then repeats the process while varying the time step index N from 0 to $N_f$. A union is determined between the multi-actor set of states $\mathcal{M}_{N-k}$, where the union is an avoidance set $\cup_{k=0}^{N}\mathcal{M}_{N-k}$ for the multi-actor set of states. The avoidance set $\cup_{k=0}^{N}\mathcal{M}_{N-k}$ for the multi-actor set of states is saved as one or more look-up tables 104 and are indexed based on the speed limit. In embodiments, the data saved within the one or more look-up tables 104 may be approximated and simplified for purposes of memory allocation.

The offline module 70 then determines a plurality of occupancy sets $\mathcal{O}_{k+1}$ that bound the one or more moving obstacles 54 located in the environment 52 over the horizon of interest forward in time starting from the initial time 0 to the maximum horizon time $N_f$. The occupancy set at the initial time $\mathcal{O}_0$ is equal to the occupancy set $\mathcal{O}$. For each time step, an individual occupancy set $\mathcal{O}_{k+1}$ is determined based on Equation 5, which is:

$$\mathcal{O}_{k+1} = \text{proj}_P(\{x_{k+1} \in \mathcal{X} | \exists u_k^o \in \mathcal{U}^o, x_{k+1} = A_k x_k + B_k^h + B_k^o u_k^o\}) \quad \text{Equation 5}$$

where P represents an admissible position subspace (i.e., the allowable driving area or road geometry), X represents admissible states of the moving obstacle 54, and $x_{k+1}$ represents a state vector of the moving obstacle 54. The offline module 70 may then save the occupancy sets $\mathcal{O}_{k+1}$ over the horizon of interest from the initial time 0 to the maximum horizon time $N_f$ as one or more look-up tables 106, where the values for the occupancy sets $\mathcal{O}_{k+1}$ are indexed based on the position and velocity of the one or more moving obstacles 54 and environmental variables such as, but not limited to, road geometry, inclination, and the coefficient of friction based on road conditions.

The state monitoring system module 72 estimates the vehicle state 120, where the vehicle state 120 indicates a current position and velocity of the autonomous vehicle 12. The state monitoring system module 72 also estimates an obstacle state 122, where the obstacle state 122 indicates a current position and velocity of the one or more moving obstacles 54 located within the environment 52. It is to be appreciated that the vehicle state 120 and the obstacle state 122 are both expressed in the Frenet coordinate system. The vehicle state 120 and the obstacle state 122 are both estimated based on any estimation technique such as, for example, linear and non-linear Kalman filters or object detection and tracking systems.

The real-time module 74 determines a set of trajectory constraints based on the one or more look-up tables 102 corresponding to the evasion set $\cup_{k=0}^{N}\mathcal{C}_{N-k}$ for the set of ego states, the one or more look-up tables 104 corresponding to the avoidance set $\cup_{k=0}^{N}\mathcal{M}_{N-k}$ for the multi-actor set of states, a speed limit of the roadway 50 that the autonomous vehicle 12 is presently traveling along (seen in FIG. 2), and environmental variables such as, but not limited to, road geometry, inclination, and the coefficient of friction based on road conditions. The real-time module 74 then applies the trajectory constraints pairwise for the autonomous vehicle 12 and each of the one or more moving obstacles 54 located within the environment 52 to determine the evasion set $\cup_{k=0}\mathcal{C}^{N-k}$ for the set of ego states and the avoidance set $\cup_{k=0}^{N}\mathcal{M}_{N-k}$ for the multi-actor set of states based on a position and a velocity of the autonomous vehicle 12 and the one or more moving obstacles 54 located in the environment.

The real-time module 74 then computes the plurality of relative state trajectories $p^h(t)$ for the autonomous vehicle 12 based on an initial state of the autonomous vehicle 12, a final state of the autonomous vehicle 12, and one or more levels of driving aggression, where the plurality of relative state trajectories $p^h(t)$ avoid intersecting the evasion set $\cup_{k=0}^{N}\mathcal{C}_{N-k}$ for the set of ego states. As mentioned above, in embodiments the relative state trajectories $p^h(t)$ may slightly encroach the region of interest 60 along its boundaries 66 (FIG. 2). In an embodiment, the one or more levels of driving aggression include three levels of aggression, a conservative level, a moderate level, and an aggressive level of aggression, however, it is to be appreciated that fewer or more levels of aggression may be used as well. The relative state trajectories $p^h(t)$ are calculated based on a multi-objective optimization between cumulative jerk and driving aggression based on the initial state of the autonomous vehicle 12 and the final state of the autonomous vehicle 12. The real-time module 74 also computes a trajectory $p^o(t)$ of the moving obstacle 54 based on the same conditions for linearizing the nonlinear relative dynamics model, where the trajectory $p^o(t)$ represents the operating point about which the moving obstacle 54 motion is linearized.

The real-time module 74 then selects the trajectory 62 by assigning a score to each relative state trajectory $p^h(t)$ for the autonomous vehicle 12 based on one or more properties, and then selecting the trajectory 62 based on the score of each relative state trajectory $p^h(t)$. Specifically, the real-time module 74 selects the relative state trajectory $p^h(t)$ having the highest score as the trajectory 62. The one or more properties represent characteristics such as, but not limited to, ride comfort, fuel consumption, timing, and duration. In one embodiment, the real-time module 74 may discard any relative state trajectories $p^h(t)$ for the autonomous vehicle 12 that falls within the evasion set $\cup_{k=0}^{N} C_{N-k}$ for the set of ego states. The real-time module 74 may then select the relative state trajectory $p^h(t)$ based on the score assigned to each relative state trajectory $p^h(t)$. Referring to both FIGS. 2 and 3, the autonomous vehicle 12 follows the trajectory 62 while performing a maneuver while avoiding the one or more moving obstacles 54.

Figure 4:
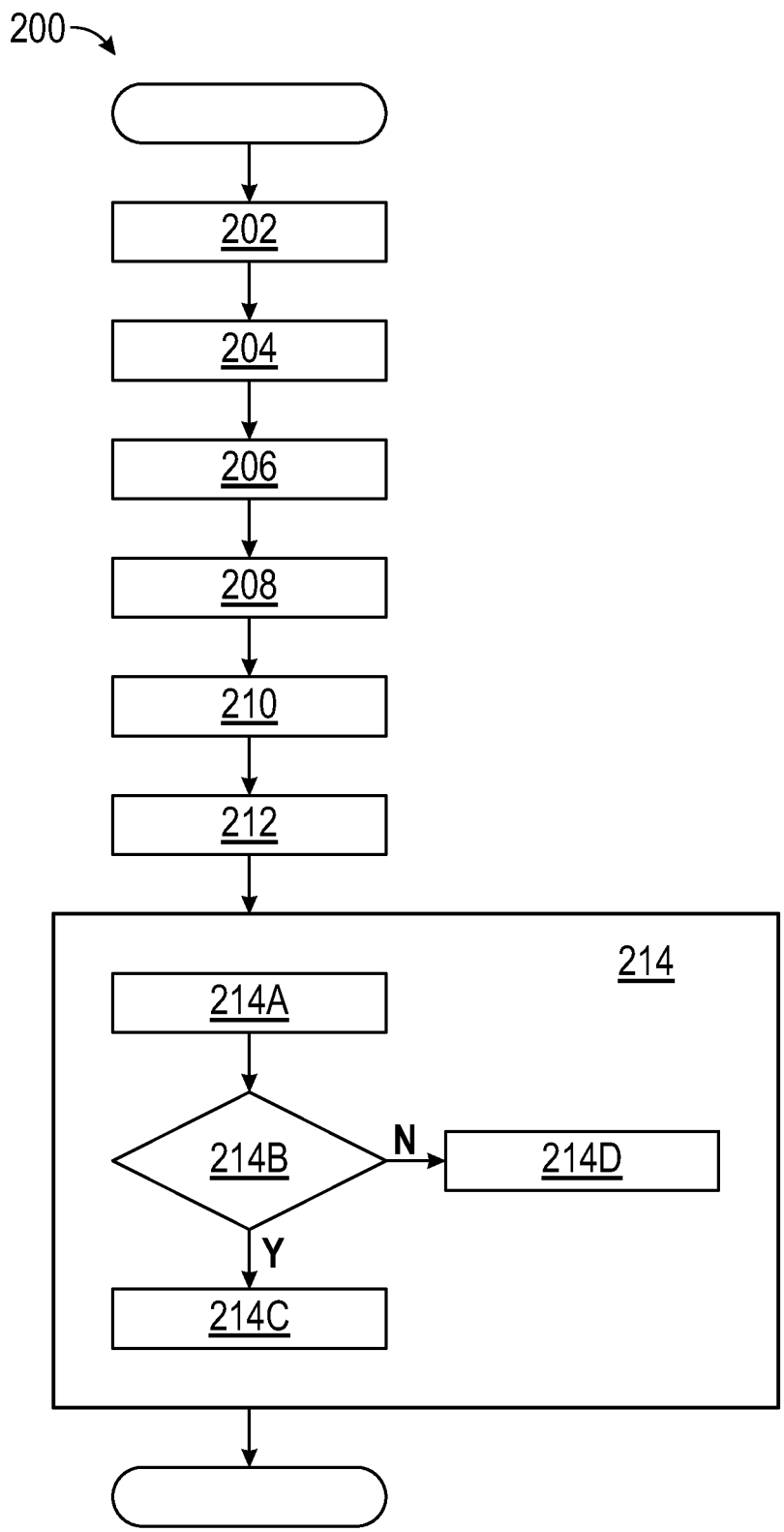
FIG. 4 is a process flow diagram illustrating a method for selecting a trajectory for the autonomous vehicle shown in FIG. 1, according to an exemplary embodiment.

FIG. 4 is a process flow diagram illustrating a method 200 for determining the trajectory 62 of the autonomous vehicle 12 by the trajectory planning system 10. Referring generally to FIGS. 1-4, the method 200 may begin at block 202. In block 202, the offline module 70 of the one or more controllers 20 determines the autonomous vehicle dynamics model for the autonomous vehicle 12 based on the dynamic variables 90, the vehicle chassis configuration information 92 for the autonomous vehicle 12, and the control input vector $u_k^o$ for the autonomous vehicle 12. The method 200 may then proceed to block 204.

In block 204, the offline module 70 of the one or more controllers 20 determine the discrete-time relative vehicle state e based on the autonomous vehicle dynamics model for the autonomous vehicle 12. The method 200 may then proceed to block 206.

In block 206, the offline module 70 of the one or more controllers 20 determine, based on the discrete-time relative vehicle state e, the position avoidance set $S$ representing relative lateral positions and longitudinal positions that the autonomous vehicle 12 avoids in order to bypass or avoid contact with the moving obstacle 54 while performing a maneuver. The method 200 may then proceed to block 208.

In block 208, the offline module 70 of the one or more controllers 20 determine the set of ego states $C_{N-k}$ for which the autonomous vehicle 12 is unable to execute maneuvers without entering the position avoidance set $S$ for a set of given speed limits and road conditions. The method 200 may then proceed to block 210.

In block 210, the offline module 70 of the one or more controllers 20 determine the evasion set $\cup_{k=0}^{N} C_{N-k}$ for the set of ego states. As mentioned above, the evasion set $\cup_{k=0}^{N} C_{N-k}$ for the set of ego states is saved as one or more look-up tables 102 and are indexed based on a current speed limit of the roadway 50 and one or more road conditions. The method 200 may then proceed to block 212.

In block 212, the real-time module 74 of the one or more controllers 20 computes the relative state trajectories $p^h(t)$ for the autonomous vehicle 12, where the relative state trajectories $p^h(t)$ avoid intersecting the evasion set $\cup_{k=0}^{N} C_{N-k}$ for the set of ego states. The method 200 may then proceed to block 214.

In block 214, the real-time module 74 of the one or more controllers 20 selects a trajectory 62 from the plurality of relative state trajectories $p^h(t)$ for the autonomous vehicle 12, where the autonomous vehicle 12 follows the trajectory 62 while performing a maneuver. Specifically, the real-time module 74 determines the trajectory 62 in blocks 214A-214D. In block 214A, the real-time module 74 assigns a score to each relative state trajectory $p^h(t)$ for the autonomous vehicle 12 based on one or more properties. In decision block 214B, if a particular relative state trajectory $p^h(t)$ has the score of all the relative state trajectories $p^h(t)$, then in block 214C the real-time module 74 selects the particular relative state trajectory $p^h(t)$ as the trajectory 62 in block 214C. Otherwise, the real-time module 74 does not select the particular relative state trajectory $p^h(t)$ as the trajectory 62.

Referring generally to the figures, the disclosed trajectory planning system provides various technical effects and benefits. Specifically, the disclosure provides a methodology and architecture that ensures maneuvers for avoiding the moving obstacles always exist and are executable by the autonomous vehicle within an operating domain of interest. It is to be appreciated that the trajectory planning system may be enhanced by applying external vehicle networks (such as V2X) to communicate with other moving obstacles located within the environment surrounding the autonomous vehicle. Furthermore, current approaches may rely upon the kinematic model to determine the headway between vehicles, however, the kinematic model does not consider linear and non-linear tire dynamics or coupling between the motion of the lateral and longitudinal states of the vehicle. In contrast, the disclosed trajectory planning system captures linear as well as non-linear tire dynamics as well as coupled lateral and longitudinal motion of the vehicle.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A trajectory planning system for an autonomous vehicle, the trajectory planning system comprising:
   one or more controllers in electronic communication with one or more external vehicle networks that collect data with respect to one or more moving obstacles located in an environment surrounding the autonomous vehicle, the one or more controllers executing instructions to:
   determine a discrete-time relative vehicle state based on an autonomous vehicle dynamics model;
   determine, based on the discrete-time relative vehicle state, a position avoidance set representing relative lateral positions and longitudinal positions that the autonomous vehicle avoids while bypassing the one or more moving obstacles when performing a maneuver;

determine a set of ego states for which the autonomous vehicle is unable to execute maneuvers without entering the position avoidance set for a set of given speed limits and road conditions;

compute a plurality of relative state trajectories for the autonomous vehicle, wherein the plurality of relative state trajectories avoid intersecting an evasion set for the set of ego states, wherein the one or more controllers determine the plurality of relative state trajectories for the autonomous vehicle based on an initial state of the autonomous vehicle, a final state of the autonomous vehicle, and one or more levels of driving aggression;

select a trajectory from the plurality of relative state trajectories for the autonomous vehicle; and follow, by the autonomous vehicle, the trajectory while performing the maneuver.

2. The trajectory planning system of claim 1, wherein the one or more controllers select the trajectory by:

assigning a score to each relative state trajectory for the autonomous vehicle based on one or more properties; and selecting the relative state trajectory having the highest score as the trajectory.

3. The trajectory planning system of claim 2, wherein the one or more properties include one or more of the following: ride comfort, fuel consumption, timing, and duration.

4. The trajectory planning system of claim 1, further comprising a plurality of sensors in electronic communication with the one or more controllers, wherein the one or more controllers receive a plurality of dynamic variables as input from the plurality of sensors.

5. The trajectory planning system of claim 4, wherein the one or more controllers determine the autonomous vehicle dynamics model for the autonomous vehicle based on the plurality of dynamic variables, vehicle chassis configuration information, and a control input vector corresponding to the autonomous vehicle.

6. The trajectory planning system of claim 1, wherein the position avoidance set is determined by:

$$\mathcal{S} = \{(e_s, e_d) \in \mathbb{R}^2 : e_{s,l} \leq e_s \leq e_{s,u}, e_{d,l} \leq e_d \leq e_{d,u}\}$$

wherein $\mathcal{S}$ is the position avoidance set, $e_s$ is a discrete-time relative longitudinal state of the autonomous vehicle, $e_d$ is a discrete-time relative lateral state of the autonomous vehicle, $e_{s,l}$ is a lower limit of the discrete-time relative longitudinal state $e_s$, $e_{s,u}$ is an upper limit of the discrete-time relative longitudinal state $e_s$, $e_{d,l}$ is a lower limit of the discrete-time relative lateral state $e_d$, and $e_{d,u}$ is a lower limit of the discrete-time relative longitudinal state $e_s$, of the position avoidance set $\mathcal{S}$.

7. The trajectory planning system of claim 1, wherein the evasion set for the set of ego states is saved as one or more look-up tables and are indexed based on a current speed limit of a roadway that autonomous vehicle is presently traveling along and one or more road conditions.

8. The trajectory planning system of claim 1, wherein the one or more levels of driving aggression include a conservative level, a moderate level, and an aggressive level of aggression.

9. The trajectory planning system of claim 1, wherein the one or more controllers determine the set of ego states during an offline process based on one of simulated data and experimental data.

10. The trajectory planning system of claim 1, wherein the one or more moving obstacles include another vehicle located along a roadway that the autonomous vehicle is driving along.

11. The trajectory planning system of claim 1, wherein the set of ego states represent vehicle states where the autonomous vehicle is unable to execute maneuvers during a time horizon to avoid the one or more moving obstacles.

12. The trajectory planning system of claim 1, wherein the autonomous vehicle dynamics model includes one or more of the following: a linear tire model and non-linear tire models.

13. The trajectory planning system of claim 1, wherein the plurality of relative state trajectories are calculated based on a multi-objective optimization between cumulative jerk and the one or more levels of driving aggression.

14. An autonomous vehicle including a trajectory planning system, the autonomous vehicle comprising:

a plurality of sensors that determine a plurality of dynamic variables;

one or more external vehicle networks that collect data with respect to one or more moving obstacles located in an environment surrounding the autonomous vehicle; and one or more controllers in electronic communication with the one or more external vehicle networks and the plurality of sensors, the one or more controllers executing instructions to:

determine an autonomous vehicle dynamics model for the autonomous vehicle based on the plurality of dynamic variables and vehicle chassis configuration information;

determine a discrete-time relative vehicle state based on the autonomous vehicle dynamics model;

determine, based on the discrete-time relative vehicle state, a position avoidance set representing relative lateral positions and longitudinal positions that the autonomous vehicle avoids while bypassing the one or more moving obstacles when performing a maneuver;

determine a set of ego states for which the autonomous vehicle is unable to execute maneuvers without entering the position avoidance set for a set of given speed limits and road conditions;

compute a plurality of relative state trajectories for the autonomous vehicle, wherein the plurality of relative state trajectories avoid intersecting an evasion set for the set of ego states, wherein the one or more controllers determine the plurality of relative state trajectories for the autonomous vehicle based on an initial state of the autonomous vehicle, a final state of the autonomous vehicle, and one or more levels of driving aggression;

select a trajectory from the plurality of relative state trajectories for the autonomous vehicle; and follow, by the autonomous vehicle, the trajectory while performing the maneuver.

15. The autonomous vehicle of claim 14, wherein the one or more controllers select the trajectory by:

assigning a score to each relative state trajectory for the autonomous vehicle based on one or more properties; and selecting the relative state trajectory having the highest score as the trajectory.

16. The autonomous vehicle of claim 14, wherein the evasion set for the set of ego states is saved as one or more look-up tables and are indexed based on a current speed limit of a roadway that autonomous vehicle is presently traveling along and one or more road conditions.

17. The autonomous vehicle of claim 14, wherein the autonomous vehicle dynamics model includes one or more of the following: a linear tire model and non-linear tire models.

18. The autonomous vehicle of claim 14, wherein the plurality of relative state trajectories are calculated based on a multi-objective optimization between cumulative jerk and the one or more levels of driving aggression.

19. A method for selecting a trajectory for an autonomous vehicle, the method comprising:
   determining, by one or more controllers, a discrete-time relative vehicle state based on an autonomous vehicle dynamics model, wherein the one or more controllers are in electronic communication with one or more external vehicle networks that collect data with respect to one or more moving obstacles located in an environment surrounding the autonomous vehicle;
   determining, based on the discrete-time relative vehicle state, a position avoidance set representing relative lateral positions and longitudinal positions that the autonomous vehicle avoids while bypassing the one or more moving obstacles when performing a maneuver;
   determining a set of ego states for which the autonomous vehicle is unable to execute maneuvers without entering the position avoidance set for a set of given speed limits and road conditions;
   computing a plurality of relative state trajectories for the autonomous vehicle, wherein the plurality of relative state trajectories avoid intersecting an evasion set for the set of ego states, wherein the one or more controllers determine the plurality of relative state trajectories for the autonomous vehicle based on an initial state of the autonomous vehicle, a final state of the autonomous vehicle, and one or more levels of driving aggression;
   selecting a trajectory from the plurality of relative state trajectories for the autonomous vehicle; and
   following, by the autonomous vehicle, the trajectory while performing the maneuver.

20. The method of claim 19, wherein the trajectory is selected by:
   assigning a score to each relative state trajectory for the autonomous vehicle based on one or more properties; and
   selecting the relative state trajectory having the highest score as the trajectory.

* * * * *